US012246422B2

(12) United States Patent
Hoshiyama et al.

(10) Patent No.: US 12,246,422 B2
(45) Date of Patent: Mar. 11, 2025

(54) DRIVING TOOL

(71) Applicant: MAKITA CORPORATION, Anjo (JP)

(72) Inventors: Nobuyuki Hoshiyama, Anjo (JP); Masaya Nagao, Anjo (JP)

(73) Assignee: MAKITA CORPORATION, Anjo (JP)

( * ) Notice: Subject to any disclaimer, the term of this patent is extended or adjusted under 35 U.S.C. 154(b) by 13 days.

(21) Appl. No.: 18/227,020

(22) Filed: Jul. 27, 2023

(65) Prior Publication Data

US 2024/0066672 A1 Feb. 29, 2024

(30) Foreign Application Priority Data

Aug. 30, 2022 (JP) ................................ 2022-136617

(51) Int. Cl.
*B25C 1/04* (2006.01)
*B25C 1/06* (2006.01)

(52) U.S. Cl.
CPC ................ *B25C 1/047* (2013.01); *B25C 1/06* (2013.01)

(58) Field of Classification Search
CPC .. B25C 1/047; B25C 1/06; B25C 1/04; B25C 1/001
USPC ................................................. 227/107–155
See application file for complete search history.

(56) References Cited

U.S. PATENT DOCUMENTS 10,821,586 B2 * 11/2020 Wu ......................... B25C 1/047
2008/0105725 A1 * 5/2008 Tamura ................... B25B 23/10 227/119
2008/0179372 A1 * 7/2008 Kurth ...................... B25C 1/184 227/120
2011/0198381 A1 * 8/2011 McCardle ................. B25C 1/06 227/8
2013/0134204 A1 * 5/2013 Morioka ................... B25C 1/08 227/107
2014/0202724 A1 * 7/2014 Moore .................... B25C 1/047 173/46
2016/0229043 A1 * 8/2016 Wyler ..................... B25C 1/047
2016/0288305 A1 * 10/2016 McCardle ............... B25C 1/047
2017/0190037 A1 * 7/2017 Sato .......................... B25C 1/06
2018/0126529 A1 * 5/2018 Pomeroy ................. B25C 1/008
2018/0126530 A1 * 5/2018 Pomeroy ................. B25C 1/047
2018/0126532 A1 * 5/2018 Pomeroy ................... B25C 5/13
2018/0154505 A1 6/2018 Sato et al.
2018/0178361 A1 * 6/2018 Kabbes ................... B25C 1/008
2019/0126453 A1 * 5/2019 Po ........................... B25C 1/047
2019/0375084 A1 * 12/2019 Bierdeman ............. B25C 1/047

(Continued)

FOREIGN PATENT DOCUMENTS

JP 6485544 B2 3/2019

*Primary Examiner* — Robert F Long
(74) *Attorney, Agent, or Firm* — Oliff PLC

(57) ABSTRACT

A driving tool has a configuration for preventing deviation of a driving posture of driving members from intended position during a use. The driving tool has a guide member supplied to a driving passage and a relief passage for an engagement portion of a driver to pass. The relief passage is therefore blocked by the guide member, stabilizing a driving posture of the driving member. The guide member is then pushed by a lowermost engagement portion of the driver so as to be retreaded from the relief passage, thereby allowing the engagement portion to move downward in the relief passage.

19 Claims, 7 Drawing Sheets

(56) References Cited

U.S. PATENT DOCUMENTS

| | | | | |
|---|---|---|---|---|
| 2020/0114500 | A1* | 4/2020 | Bierdeman | B25C 1/047 |
| 2020/0164498 | A1* | 5/2020 | Wechselberger | B25C 1/047 |
| 2020/0223044 | A1* | 7/2020 | Xiao Chuan | B25C 1/047 |
| 2020/0282534 | A1* | 9/2020 | Po | B25C 1/06 |
| 2021/0008701 | A1* | 1/2021 | Tan | B25C 1/06 |
| 2021/0031347 | A1 | 2/2021 | Sato et al. | |
| 2021/0205969 | A1* | 7/2021 | Zhu | B25C 1/06 |
| 2021/0291335 | A1* | 9/2021 | Liu | B25C 1/047 |
| 2021/0299835 | A1* | 9/2021 | Ward | B25C 1/005 |
| 2021/0299836 | A1* | 9/2021 | Baba | B25C 1/06 |
| 2021/0316433 | A1* | 10/2021 | Ueda | B25C 1/047 |
| 2022/0134525 | A1* | 5/2022 | Bandy | B25C 5/1665 227/123 |
| 2022/0143798 | A1* | 5/2022 | Cholst | B25C 1/041 |
| 2022/0219301 | A1* | 7/2022 | Bierdeman | B25C 1/047 |
| 2022/0250222 | A1* | 8/2022 | Garces | B25C 1/047 |
| 2023/0211483 | A1 | 7/2023 | Sato et al. | |
| 2024/0066672 | A1* | 2/2024 | Hoshiyama | B25C 1/047 |
| 2024/0308042 | A1* | 9/2024 | Bierdeman | B25C 1/047 |

* cited by examiner

DRIVING TOOL

CROSS-REFERENCE

This application claims priority to Japanese patent application serial number 2022-136617, filed on Aug. 30, 2022, the contents of which are incorporated herein by reference in their entirety for all purposes.

TECHNICAL FIELD

The present disclosure generally relates to a driving tool for driving a material, such as a nail or a staple, into a workpiece, such as, for example, a wooden material.

BACKGROUND ART

For example, a gas-spring type driving tool that utilizes a thrust power of compressed gas as a driving force is known. The gas-spring type driving tool may include a piston that moves in an up-down direction within a cylinder and a driver that is connected to the piston. The driver may move integrally with the piston in the up-down direction and drive a driving member. The piston and the driver may move downward in a driving direction owing to a pressure of the gas filled in an accumulation chamber. The piston and the driver may return in a direction opposite to the driving direction by a lift mechanism.

The lift mechanism may include a wheel that engages the driver that includes a plurality of engagement portions. The wheel may include a plurality of engaging portions, each of which successively engages a corresponding engagement portion of the driver. The wheel may be rotated by an electric motor. After a driving operation has been completed, each of the plurality of the engaging portions of the wheel may successively engages a corresponding engagement portions of the driver by rotation of the wheel, thereby moving the driver in the direction opposite to the driving direction. By returning the driver in the direction opposite to the driving direction, the gas pressure in the accumulation chamber may increase. When the driver returns in the direction opposite to the driving direction, a driving member may be supplied to a driving passage. An engagement state of the lift mechanism with respect to the driver may be released in a vicinity of a movement end of the driver in the direction opposite to the driving direction. Because of this configuration, the driver may move in the driving direction owing to the gas pressure in the accumulation chamber, thereby performing a driving operation.

In the driving tool disclosed as above, the driving passage, through which the driver moves, may further include a passage for passing through the plurality of engagement portions of the driver (a passage for passing through the plurality of engagement portions of the driver may be arranged in parallel with the driving passage through which the driver moves). Because of this configuration, it may sometimes happen that a driving posture of the driving member becomes unstable. Especially, when a short-sized driving member is driven, a posture of the short-sized driving member becomes unstable, for example, in a case where the driving member has been tilted for some reason or other. Thus, there is a need for a driving tool in which a driving posture of the driving member is stabilized.

SUMMARY

According to one aspect of the present disclosure, a driving tool comprises a piston configured to move in a driving direction owing to a pressure of a gas, and a driver configured to drive a driving member by moving integrally with the piston in the driving direction. The driving tool also comprises a plurality of engagement portions formed in the driver and arranged in a longitudinal direction of the driver, and a lifter that successively engages one of the plurality of engagement portions so as to return the driver to an initial position of the driver. The driving tool also comprises a driving passage into which the driving member is supplied and through which the driver passes, and a relief passage which is open to the driving passage and through which the plurality of engagement portions of the driver passes when the driver passes therethrough. The driving tool also comprises a guide member movable between a closing position in which the relief passage is closed and an opening position in which the relief passage is open.

Because of this configuration, when the guide member is disposed in the closing position to cause the relief passage to be blocked by the guide member, a driving posture of the driving member in the driving passage can be stabilized. Also, the downward movement of the driver which causes the plurality of engagement portions of the driver to push the guide member to the opening position allows the plurality of engagement portions of the driver to move in the relief passage.

DETAILED DESCRIPTION

Figure 1:
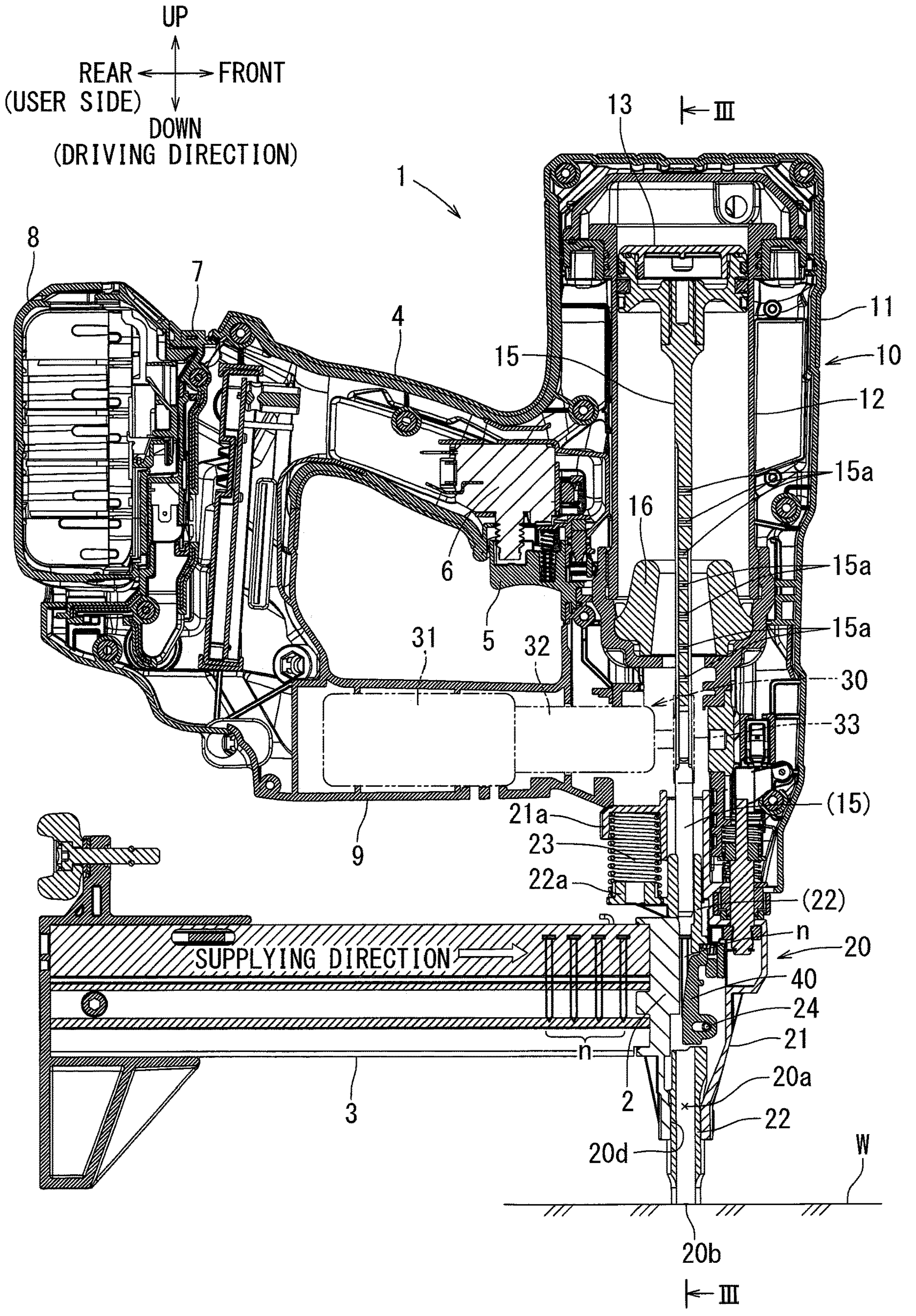
FIG. 1 is a longitudinal cross-sectional view of a driving tool, which is viewed from a right side thereof, according to an embodiment of the present disclosure. This figure shows a state in which a driver is at an initial position.

The detailed description set forth below, when considered with the appended drawings, is intended to be a description of exemplary embodiments of the present disclosure and is not intended to be restrictive and/or to represent the only embodiments in which the present disclosure can be practiced. The term “exemplary” used throughout this description means “serving as an example, instance, or illustration,” and should not necessarily be construed as preferred or advantageous over other exemplary embodiments. The detailed description includes specific details for the purpose of providing a thorough understanding of the exemplary embodiments of the disclosure. It will be apparent to those skilled in the art that the exemplary embodiments of the disclosure may be practiced without these specific details. In some instances, these specific details refer to well-known structures, components, and/or devices that are shown in block diagram form in order to avoid obscuring significant aspects of the exemplary embodiments presented herein.

According to another aspect of the present disclosure, for example, when the driver moves downward, the driver engages the guide member such that the guide member moves from the closing position to the opening position. The guide member therefore moves from the closing position to the opening position by a movement of the driver. Accordingly, a specific means for moving the guide member may not be needed.

According to another aspect of the present disclosure, for example, the guide member moves between the closing position and the opening position by rotation of the guide member. The guide member therefore moves between the closing position and the opening position by a simple supporting configuration.

According to another aspect of the present disclosure, for example, the guide member includes a rotation support portion on an upstream side of the guide member in the driving direction, and the guide member includes a movement guide such that a downstream side of the guide member in the driving direction is guided by the movement guide. Thus, a rotation movement of the guide member can be stabilized.

According to another aspect of the present disclosure, for example, the driving tool further comprises a biasing member that biases the guide member to the closing position. A state in which the relief passage is closed by the guide member can be retained by the biasing member, and a movement of the guide member to the opening position can be made against the biasing member.

According to another aspect of the present disclosure, for example, the driving tool further comprises a damper that contacts the guide member when the guide member moves from the closing position to the opening position. The damper can absorb an impact of the guide member when the guide member moves to the opening position.

According to another aspect of the present disclosure, for example, the guide member extends on a downstream side in the driving direction beyond a lower end of a moving area of the plurality of engagement portions of the driver. Accordingly, the guide member extends long in the driving direction. Therefore, a driving posture of the driving member can be stabilized in a reliable manner.

According to another aspect of the present disclosure, for example, the guide member is configured to be arranged along the driving member supplied to the driving passage and extend below the driving member on a downstream side in the driving direction. Accordingly, a supply position of the driving member when the driving member is supplied as well as a position of the driving member when the driving member is driven can be stabilized.

According to another aspect of the present disclosure, for example, the guide member is arranged to be movable in a direction perpendicular to a protruding direction of the plurality of engagement portions of the driver. It is configured that when the driver moves downward in the up-down direction, the engagement portion of the driver pushes an engaging surface of the guide member, thereby moving the guide member in the opening position. Accordingly, the guide member can be arranged in a compact manner with respect to the driver. Eventually, the driving nose can be arranged in a compact manner in the left-right direction.

According to another aspect of the present disclosure, for example, a direction in which the guide member moves from the closing position to the opening position is configured to be aligned with a direction in which the driving member is supplied to the driving passage. Accordingly, the driving nose can be made compact in a direction (in the left-right direction) perpendicular to a moving direction of the guide member.

Next, an embodiment according to the present disclosure will be described with reference to FIGS. 1 to 7. FIG. 1 shows an example of a driving tool 1. The driving tool 1 of FIG. 1 is, for example, a gas-spring type driving tool that utilizes a pressure of a gas filled in a chamber above a cylinder 12 as a thrust power for driving a driving member n. In the following explanation, a driving direction of the driving member n is a downward direction, and a direction opposite to the driving direction is an upward direction. In FIG. 1, a user of the driving tool 1 may be generally situated on a rear side of the driving tool 1. The rear side of the driving tool 1 may be also referred to as a user side, and a side in a forward direction may be referred to as a front side. A left and right side may be based on a user's position when situated on the rear side of the driving tool 1.

Figure 2:
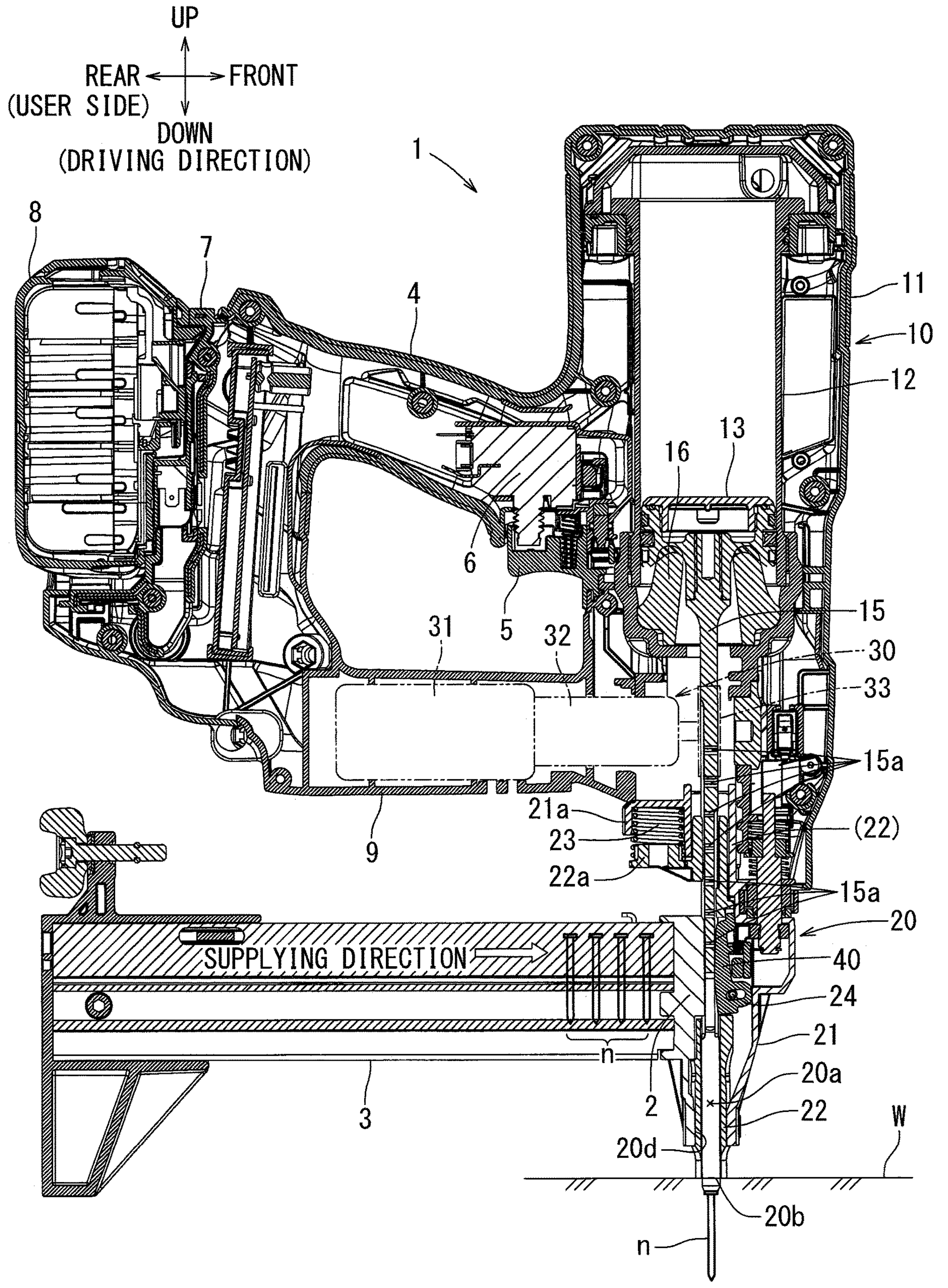
FIG. 2 is a longitudinal cross-sectional view of the driving tool when viewed from the right side thereof, showing a state in which the driver has moved to a lower end position.
Figure 3:
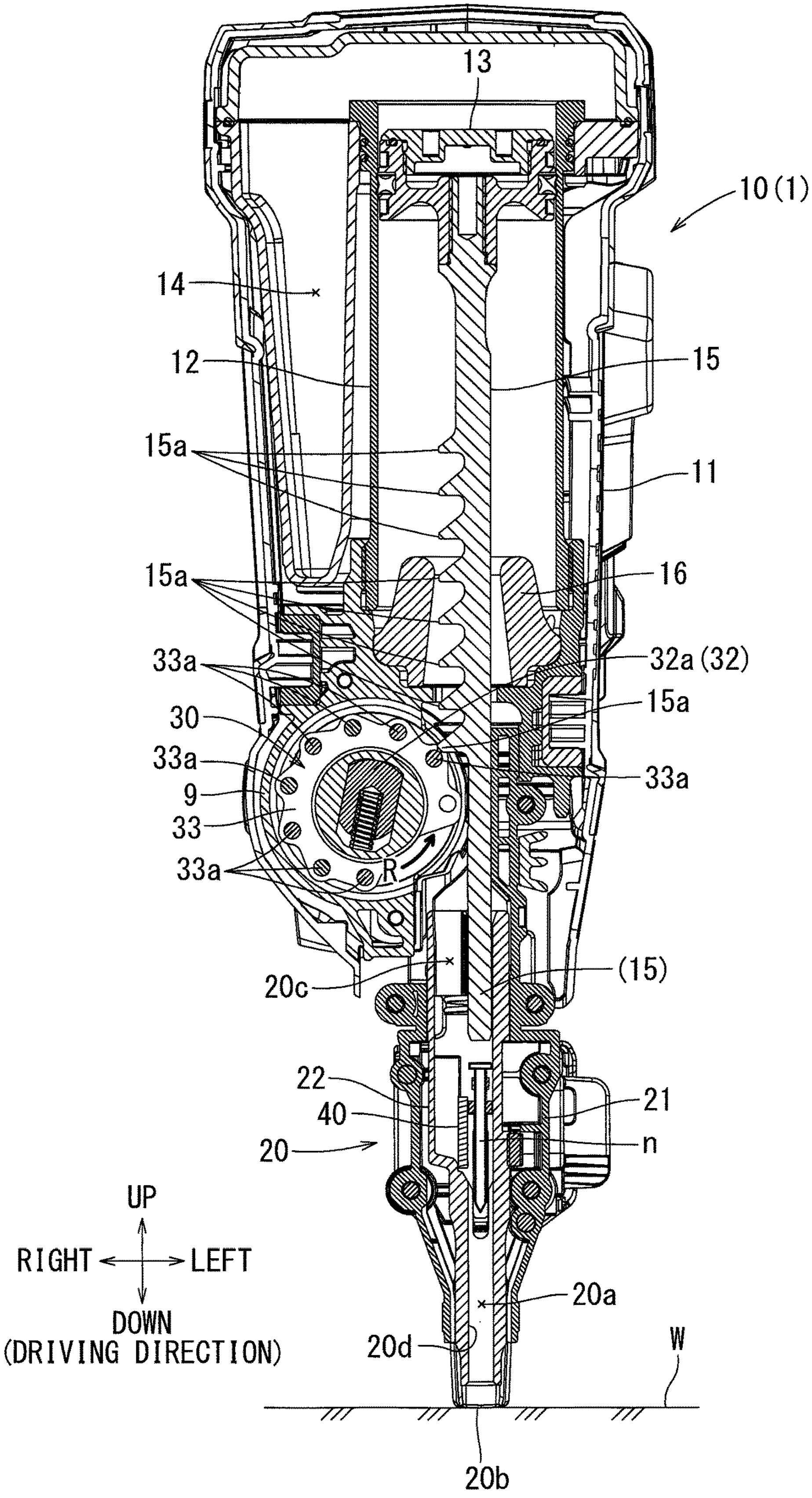
FIG. 3 is a cross-sectional view taken along line of FIG. 1, showing a longitudinal cross-sectional view of the driving tool when viewed from a front side thereof.

As shown in FIGS. 1 to 3, the driving tool 1 may include a tool main body 10. The tool main body 10 may be configured to include a cylinder 12 that is housed in a tubular main body housing 11. A piston 13 may be housed within the cylinder 12, so as to be able to be reciprocated in an up-down direction. An upper portion of the cylinder 12, which is a portion that is above the piston 13, may communicate with an accumulation chamber 14. A compressible gas such as, for example, air, may be filled in the accumulation chamber 14. A pressure of the gas filled in the accumulation chamber 14 may act on an upper surface of the piston 13, thereby providing a thrust power for a driving operation.

As shown in FIG. 3, a lower portion of the cylinder 12 may communicate with a driving passage 20*a* of a driving nose 20. The driving nose 20 may be provided at a lower portion of the tool main body 10. The driving nose 20 may include a nose frame 21 that is connected to a lower portion of the main body housing 11. The driving nose 20 may also include a driver guide 22 that is supported on an inner peripheral side of the nose frame 21 so as to be movable in an up-down direction. The driving passage 20*a* may be on an inner peripheral side of the driver guide 22. An all-periphery-guide-portion 20*d* may be arranged in a lower side area of the driving passage 20*a*. A wall portion of the driver guide 22 may be formed over an entire circumference of the driving passage 20*a*. The all-periphery-guide-portion 20*d* may be formed by a single member over its entire circumference, thereby guiding a driving member n along the entire circumference of the all-periphery-guide portion 20*d*. A driving posture of the driving member n is therefore stabilized. An ejection port 2*b* may be at a lower end of the driver guide 22 (a lower end of the all-periphery-guide portion 20*d*).

As shown in FIG. 1, a spring holder 21*a* may be arranged on a rear side of the nose frame 21. A spring receiver 22*a* may be arranged on a rear side of the driver guide 22. The spring holder 21*a* may face the spring receiver 22*a* in an up-down direction. A compression spring 23 may be held between the spring holder 21*a* and the spring receiver 22*a*. The driver guide 22 may be spring-biased downward by a biasing force of the compression spring 23. Further, as shown in FIG. 1, a lower end of the driver guide 22 (the ejection port 20*b*) may protrude from a lower end of the nose frame 21.

As shown in FIG. 2, when a driving operation is performed, the driver main body 10 may be pushed downward in the driving direction in a state in which the ejection port

20*b* of the driver guide 22 contacts a workpiece W. Because of this configuration, the driver guide 22 may be relatively moved with respect to the nose frame 21 against the biasing force of the compression spring 23. An upward movement of the driver guide 22 may be detected by a detection means that is not shown in the figures. When the upward movement of the driver guide 22 is detected, an on-operation of a switch lever 5, which is discussed later, may be effective, thereby driving a driving member n. The driving operation may be performed on a condition that the ejection port 20*b* contacts the workpiece W so as to move the driver guide 22 relatively upward with respect to the nose frame 21, thereby preventing an inadvertent driving operation.

As shown in FIG. 1, a magazine 3 may be linked to a rear portion of the nose frame 21 via a magazine base 2. A plurality of driving members n may be loaded within the magazine 3. The plurality of driving members n may be loaded so as to be temporary coupled in parallel at regular intervals by a connection band. The plurality of driving members n may be supplied from within the magazine 3 to the driving passage 20*a* of the driving nose 20 one by one so as to extend in the up-down direction, interlocking with a driving operation of the tool main body 10. As shown by a void arrow in FIG. 1, the plurality of driving members n may be supplied pitch by pitch in a forward direction. The driver guide 22 may include a guide member 40 for guiding the driving member n supplied to the driving passage 20*a*. The guide member 40 will be discussed later in detail.

As shown in FIG. 1, a driver 15 may be connected to a lower portion of the piston 13. A lower portion of the driver 15 may enter the driving passage 20*a* of the driving nose 20. The driver 15 may move downward within the driving passage 20*a* owing to the pressure of the gas filled in the accumulation chamber 14, the gas being configured to act on the upper surface of the piston 13. The lower portion of the driver 15 may drive a driving member n that has been supplied to the driving passage 20*a*. The driving member n being driven by the driver 15 may be ejected from the ejection port 20*b* of the driving nose 20. The driving member n that is ejected from the ejection port 20*b* may be driven into the workpiece W. A damper 16, which is for absorbing an impact of the piston 13, may be disposed on a lower side of the cylinder 12.

As shown in FIG. 3, a plurality of engagement portions 15*a* (eight engagement portions in FIG. 3) may be formed on a right side of the driver 15. Each of the plurality of engagement portions 15*a* may be formed in a rack tooth shape projecting in a rightward direction. The plurality of engagement portions 15*a* may be arranged at specified intervals in a longitudinal direction of the driver 15 (in an up-down direction). Each of the plurality of engagement portions 15*a* of the driver 15 may engage a corresponding engaging portion 33*a* of a lift wheel 33 in a lift mechanism 30, an embodiment of which is discussed later in detail.

As shown in FIGS. 1 and 2, a grip 4, which is configured to be held by a user, may be arranged on a rear side of the tool main body 10. A switch lever 5, which is configured to be pulled by a fingertip of the user, may be arranged on a lower surface of a front portion of the grip 4. As described above, when the ejection port 20*b* of the driving nose 20 contacts the workpiece W so as to move the driver guide 22 relatively upward with respect to the nose frame 21, a pull operation of the switch lever 5 may be effective. When the switch lever 5 is pulled, a switch main body 6 may be switched on, thereby activating the electric motor 31 of the lift mechanism 30, which is discussed later in detail.

A battery attachment portion 7 may be arranged on a rear side of the grip 4. A battery pack 8 may be attached to a rear surface of the battery attachment portion 7. The battery pack 7 may be attached to and detached from the battery attachment portion 7 by sliding the battery pack 8 with respect to the battery attachment portion 7 in the up-down direction. The battery pack 8 may be removed from the battery attachment 7 so as to be recharged by a dedicated charger and repeatedly used. The battery pack 8 may have high versatility so as to be used as a power source for various electric tools. The battery pack 8 may serve as a power source for supplying power to the electric motor 31 of the lift mechanism 30.

As shown in FIG. 1, a drive unit housing 9 may be formed between a lower portion of the battery attachment portion 7 and the tool main body 10. The electric motor 31 of the lift mechanism 30 may be housed in the drive unit housing 9. The lift wheel 33 may be arranged in front of the electric motor 31 via a reduction gear train 32.

As shown in FIG. 3, the lift wheel 33 may be arranged on a right side of the driver 15. The lift wheel 33 may be supported by an output shaft 32*a* of the reduction gear train 32. The lift wheel 33 may include a plurality of engaging portions 33*a* (for example, eight engaging portions), each of which may successively engage a corresponding engagement portion 15*a* of the driver 15. A cylindrical shaft member (e.g. a pin) may be used for each of the plurality of engaging portions 33*a*. The plurality of engaging portions 33*a* may be arranged at predetermined intervals along an outer peripheral edge of the lift wheel 33. The engaging portions 33*a* may be absent from an area spanning approximately, for example, one fourths of the lift wheel 33, between a first engaging portion 33*a* and a last engaging portion 33*a*, which may be referred to as a recessed portion. When the driver 15 faces the recessed portion, an engagement state of the lift wheel 33 with respect to the engagement portion 15*a* of the driver 15 may be released. FIG. 3 shows a standby state immediately before the engagement state of the lift wheel 33 is released.

By activation of the electric motor 31, the output shaft 32*a* and lift wheel 33 may integrally rotate in a direction indicated by an arrow R in FIG. 3 (in a counterclockwise direction). FIG. 2 shows a state immediately after the driver 15 has moved to a lower end position to drive a driving member n. After the driver 15 has reached the lower end position, the plurality of engaging portions 33*a* of the lift wheel 33 may successively engage a lower portion of a corresponding engagement portion 15*a* of the driver 15 by rotation of the lift wheel 33 in a direction indicated by an arrow R in FIG. 3. Because of this configuration, the driver 15 may return in an upward direction. The pressure of the gas in the accumulation chamber 14 may increase owing to an upward movement of the piston 13 by the lift mechanism 30. When the driver 15 returns an initial portion shown in FIG. 1, the electric motor 31 may stop and a sequence of the driving operation may be completed.

When the switch lever 5 is pulled again, the lift mechanism 30 may be activated. The lift wheel 33 may rotate in a direction indicated by an arrow R. An engagement of the lift wheel 33 with respect to the engagement portion 15*a* of the driver 15 may be released. Therefore, the driver 15 may move downward owing to the gas pressure filled in the accumulation chamber 14. The driver 15 may move downward through the driving passage 20*a*, thereby driving a driving member n into the workpiece W.

Figure 5:
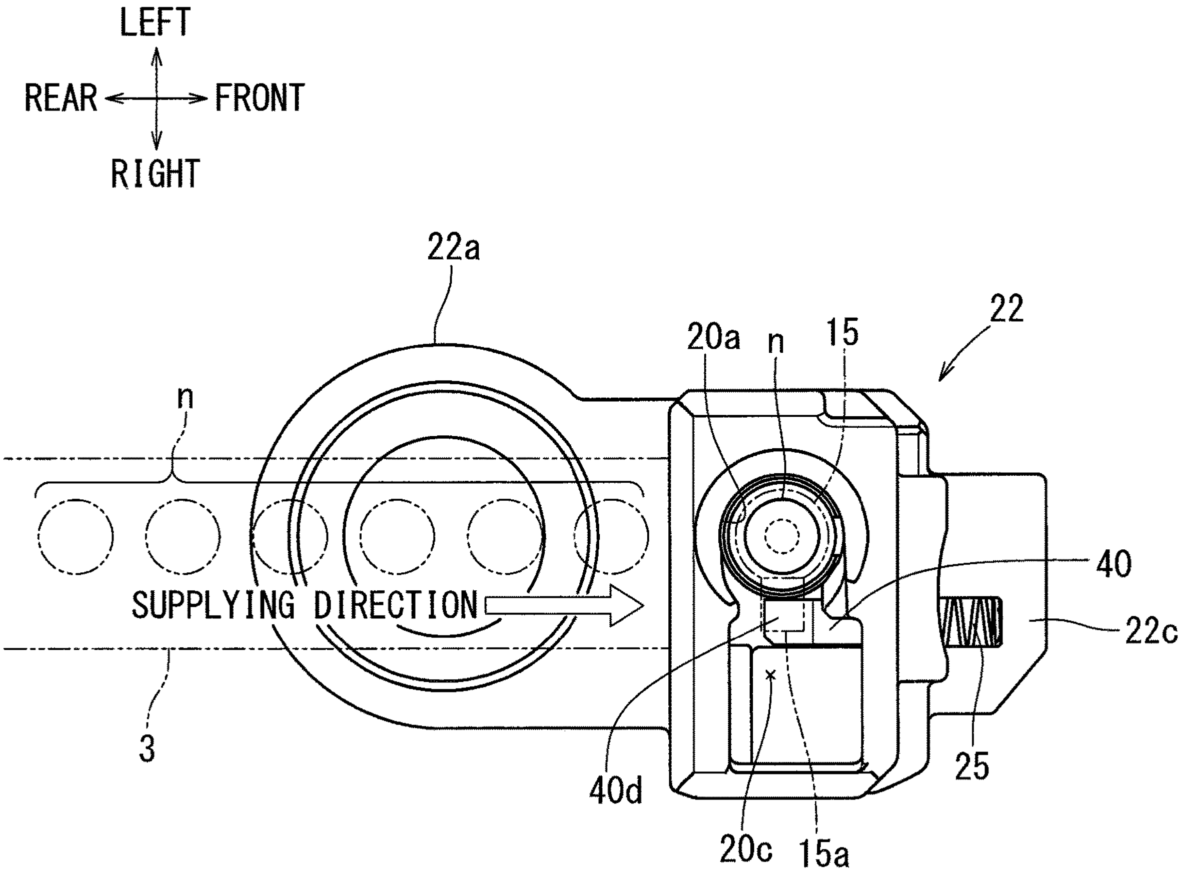
FIG. 5 is a top view of the driver guide, which is viewed in a direction indicated by an arrow V in FIG. 4.

As shown in FIG. 5, the driver guide 22 may include the driving passage 20*a* through which the driver 15 passes. The driver guide 22 may also include a relief passage 20*c* through which the plurality of engagement portions 15*a* of the driver 15 pass when the driver 15 passes through the driving passage 20*a*. The driver guide 22 may also include the guide member 40 that regulates a driving posture of the driving member n. As shown in FIGS. 3 and 5, the relief passage 20*c* may be open to the driving passage 20*a* and arranged along a right side of the driving passage 20*a*. The driver 15 may reciprocate within the driving passage 20*a* in the up-down direction and the plurality of engagement portions 15*a* of the driver 15 may reciprocate within the relief passage 20*c* in the up-down direction. As shown in FIG. 3, the relief passage 20*c* may be arranged in an arear from an upper portion of the driving passage 20*a* to approximately a center portion of the driving passage 20*a* in a longitudinal direction of the driving passage 20*a* (in the up-down direction).

Figure 4:
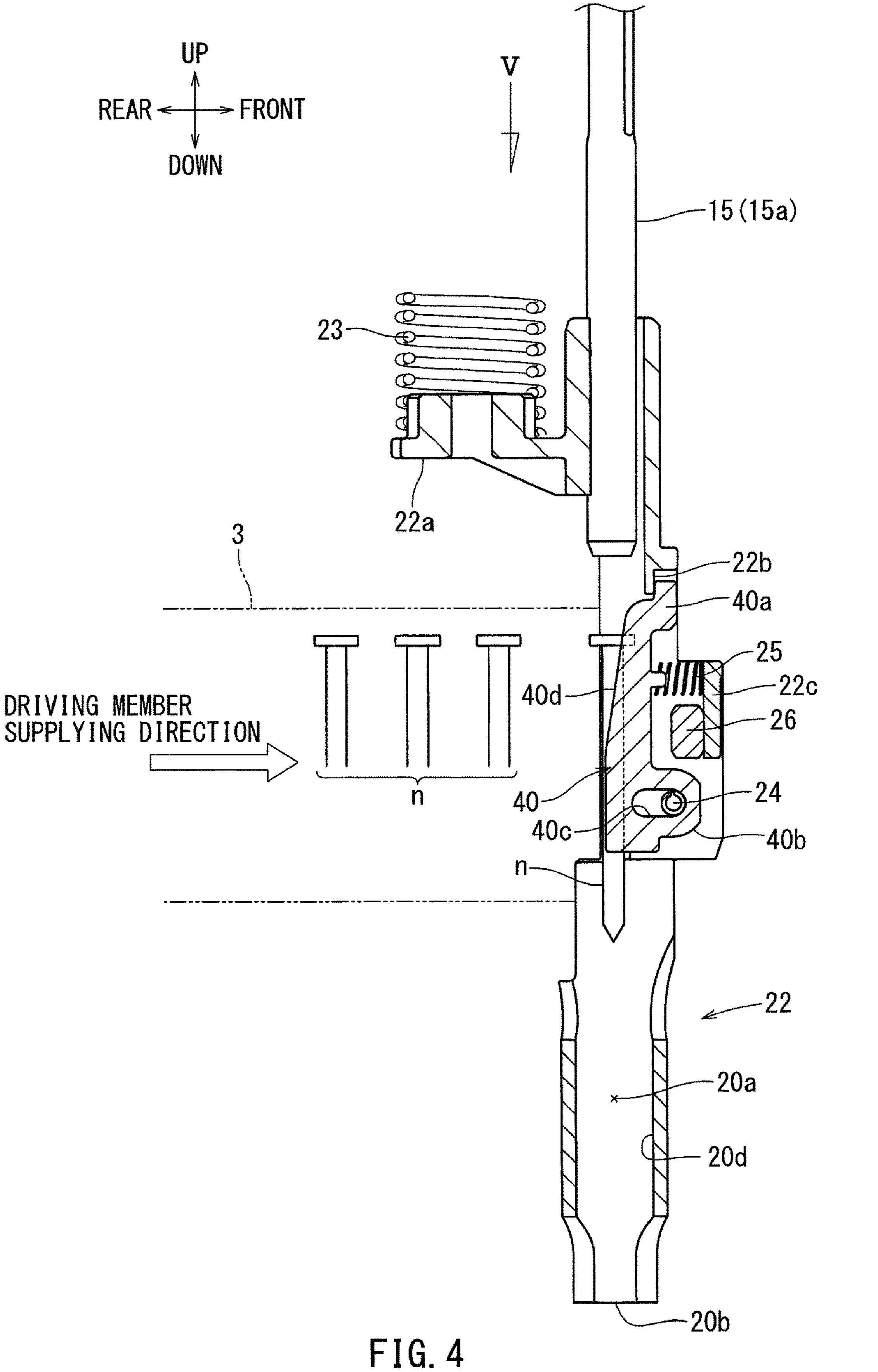
FIG. 4 is a longitudinal cross-sectional view of a driver guide, showing a longitudinal cross-sectional view of the driver guide when viewed from a right side thereof.

As shown in FIGS. 1, 3 and 4, the guide member 40 may be in a long plate shape extending in the up-down direction. The guide member 40 may extend in an area from approximately a center portion of the relief passage 20*c* to a lower position of the relief passage 20*c* in a longitudinal direction of the relief passage 20*c* (in the up-down direction). The guide member 40 may be configured to move between a closing position and an opening position. The guide member 40 may close the relief passage 20*c* in the closing position and open the relief passage 20*c* in the opening position. FIGS. 4 and 5 show a state in which the guide member 40 is located in the closing position. When the guide member 40 is moved to the closing position, the guide member 40 may be positioned on a right side of the driving member n supplied to the driving passage 20*a*. By a presence of the guide member 40 positioned in the closing position, the driving member n may be guided so as not to be tilted with respect to a driving direction when the driving member n is supplied and driven.

As shown in FIGS. 4 and 5, an engaging surface 40*d* may be formed in a rear portion of the guide member 40. The engaging surface 40*d* may extend from an upper portion to approximately a center portion of the guide member 40 in its longitudinal direction. The engaging surface 40*d* may be tilted in a rearward direction as it extends in a downward direction. When the driver 15 moves downward, the plurality of engagement portions 15*a* may push the engaging surface 40*d* of the guide member 40 from upward. The driver 15 may enter the closing position, which is disposed in a rearward direction. The guide member 40 may open the relief passage 20*c* in the opening position, which is disposed in a forward direction. According to the downward movement of the driver 15, the guide member 40 may move from the closing position to the opening position.

As shown in FIGS. 4-7, the guide member 40 may include a hook portion 40*a* on an upstream side in the driving direction. The hook portion 40*a* may be bent in a L shape. The hook portion 40*a* may engage an engaging portion 22*b* formed in the driver guide 22. Because of this configuration, the hook portion 40*a* may be prevented from displacing to a side of the driving passage 20*a*. The guide member 40 may be turnable in the front-rear direction around an engaging part of the hook portion 40*a* (which serves as a rotation support portion) with respect to the engaging portion 22*b*.

As shown in FIGS. 4-7, the guide member 40 may include a movement guide 40*b* on a downstream side in the driving direction. The movement guide 40*b* may protrude in a forward direction. The movement guide 40*b* may include a support hole 40*c*. The support hole 40*c* may be in a groove hole shape and extend in the front-rear direction. A support shaft 24 may be inserted to the support hole 40*c*. The support shaft 24 may be unmovably supported by the driver guide 22. A downstream side of the guide member 40 in the driving direction may be supported so as to be movable in the front-rear direction by the movement guide 40*b* that includes the support hole 40*c* and the support shaft 24. The support shaft 24 may have a proper clearance to allow the guide member 40 to be both slidable and turnable in the front-rear direction.

As shown in FIGS. 4-7, a biasing member 25 may be disposed between the guide member 40 and a seat portion 22*c* of the driver guide 22. A compression spring may be used for the biasing member 25. The guide member 40 may be biased toward a side of the closing position by the biasing member 25. Because of this configuration, the guide member 40 may be configured to move to the opening position against a biasing force of the biasing member 25. Also, the guide member 40 may be configured to return to the closing position by the biasing force of the biasing member 25.

Still in FIGS. 4-7, the biasing member 25 may be interposed between the hook portion 40*a* and the movement guide 40*b*, the hook portion 40*a* being on an upper side and the movement guide 40*b* being on a lower side in the up-down direction. Also, the biasing member 25 may be disposed at a position a little upward of approximately a center position of the guide member 40 in the longitudinal direction of the guide member 40. Because of this configuration, a downward force of the driver 15 (the engagement portion 15*a*) that is required to move the guide member 40 to the opening position against the biasing force of the biasing member 25 may be small compared to a case where the biasing member 25 is disposed at a lower position of the guide member 40. A movement of the guide member 40 to the opening position caused by an engagement of the engagement portion 15*a* of the driver 15 with the guide member 40 from upward may include a parallel movement in a forward direction. This movement of the guide member 40 to the opening position may also include a rotation movement in the forward direction around the engaging part of the hook portion 40*a* (which serves as a rotation support portion) with respect to the engaging portion 22*b*. Because of this configuration, both the parallel and rotation movement of the guide member 40 may be allowed in a smooth manner. Accordingly, the guide member 40 may smoothly move to the opening position.

As shown in FIG. 4, a damper 26 may be arranged on a rear surface of the seat portion 22*c* of the driver guide 22. For example, a urethane rubber in a rectangular parallelopiped shape may be used for the damper 26. When the engagement portion 15*a* of the driver 15 pushes the guide member 40 to move in a forward direction beyond a shock absorptance of the biasing member 25, the damper 26 may absorb an impact from the guide member 40.

A position of the guide member 40 may be set in an appropriate manner. As shown in FIG. 5, a driving member n supplied to the driving passage 20*a* may be disposed on a left side of the guide member 40. Because of this, the driving member n may be guided such that at least a head of the driving member n is prevented from being offset in a rightward direction (toward the relief passage 20*c*). The guide member 40 may extend from an upper portion to a lower portion of the driving member n in the up-down direction when the driving member n is driven as shown in FIG. 2. Accordingly, a large area of the driving member n in its longitudinal direction may be blocked from the relief passage 20*c* by the guide member 40. Therefore, a driving posture of the driving member n may be stabilized in a reliable manner.

FIG. 3 shows a state in which a tip end of the driving member n has reached below a lower portion of the relief passage 20*c*. The tip end of the driving member n may be guided to the driving passage 20*a* from when a driving operation is started. In contrast, in a case where a short driving member n, for example, having a length of about 20 mm is supplied to the driving passage 20*a*, it may happen that a tip end of the short driving member n is above a lower portion of the relief passage 20*c*. Even so, substantially an overall area of the short driving member n in its longitudinal direction may be blocked from the relief passage 20*c* by the guide member 40. Because of this configuration, a positional offset of the short driving member n to the relief passage 20*c* may be restricted. Furthermore, a driving posture of the short driving member n may be stabilized in a reliable manner.

Figure 6:
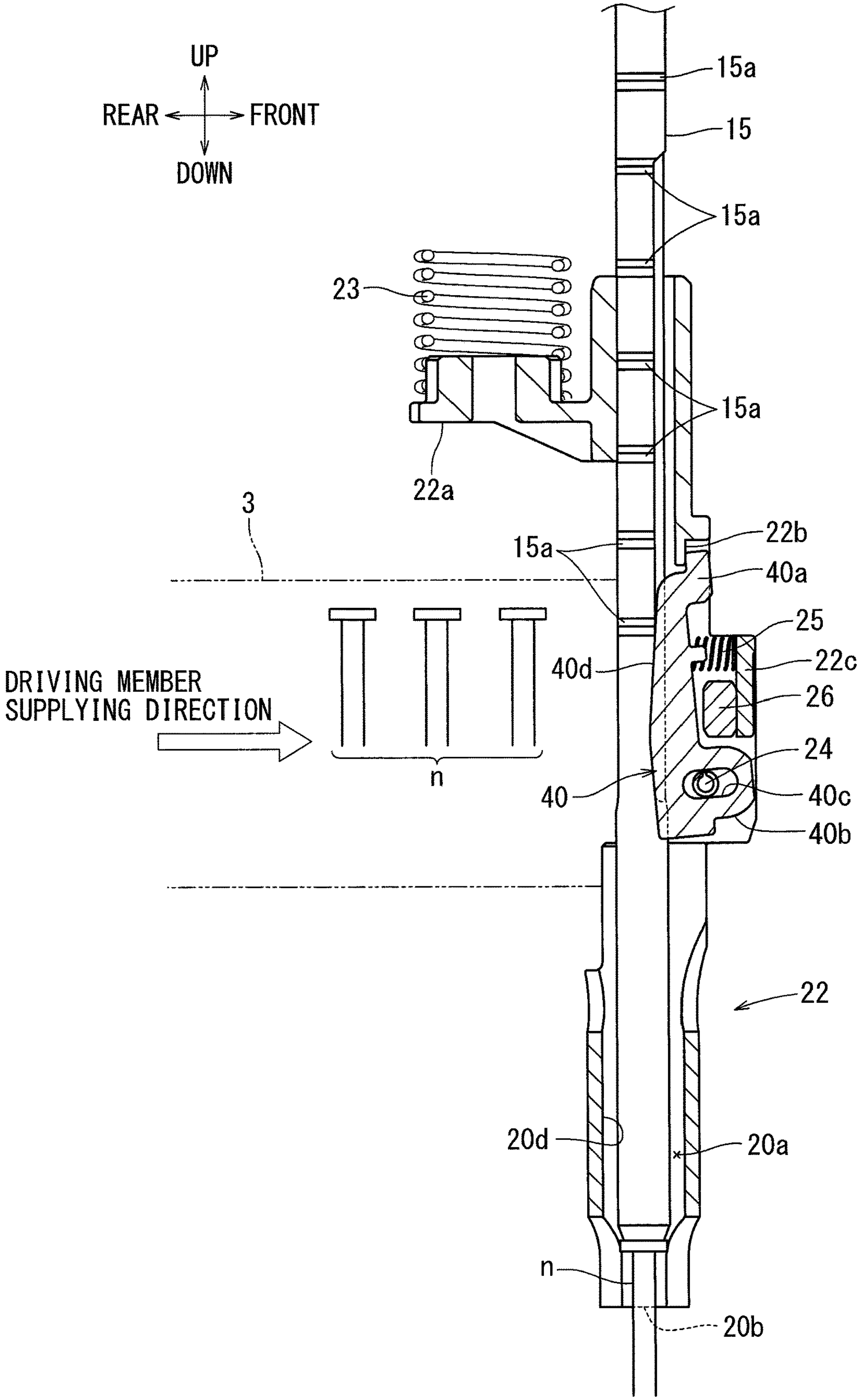
FIG. 6 is a longitudinal cross-sectional view of the driver guide, showing that the driver guide starts to move from a closing position to an opening position.
Figure 7:
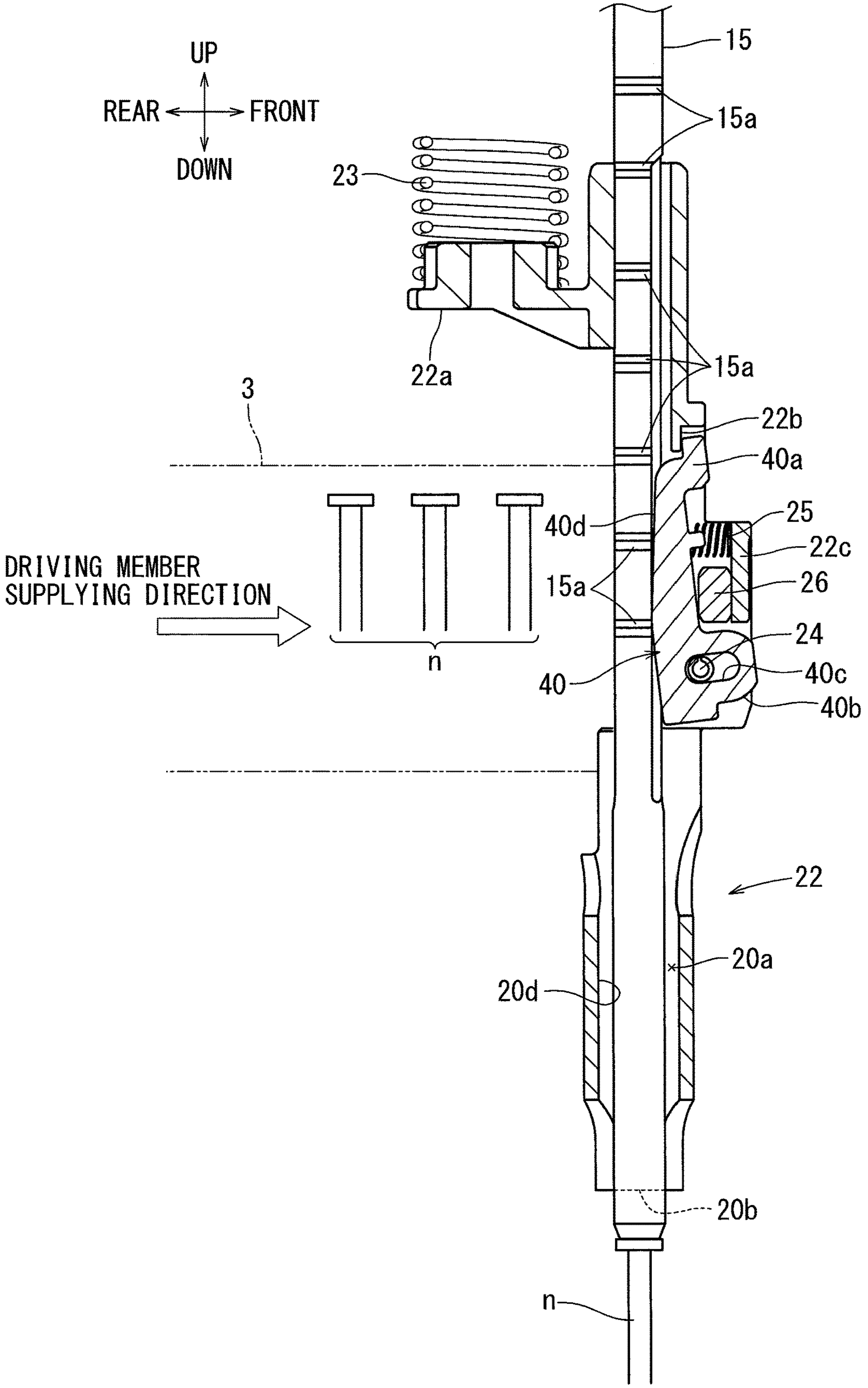
FIG. 7 is a longitudinal cross-sectional view of the driver guide, showing that the driver guide has moved to the opening position.

As shown in FIGS. 5 and 6, in a state in which the driving member n is restricted from offsetting to the relief passage 20*c* by the guide member 40, the driving member n may move downward within the driving passage 20*a* by the driver 15. As shown in FIG. 7, according to a downward movement of the driver 15, a lowermost engagement portion 15*a* may engage the engaging surface 40*d* of the guide member 40. Therefore, the guide member 40 may move to the opening position owing to a combined movement of the parallel and rotation movement of the guide member 40. Accordingly, the relief passage 20*c* may be open, thereby allowing the plurality of engagement portions 15*a* of the driver 15 to move downward within the relief passage 20*c*.

As shown in FIG. 3, the guide member 40 may extend in an area on a downstream side of the relief passage 20*c* in the driving direction beyond a lower end of a moving area of the plurality of engagement portions 15*a* of the driver 15 (a lower end portion of the relief passage 20*c*). Accordingly, a downstream side of the relief passage 20*c* may be blocked by the guide member 40, and thus a driving posture of the driving member n, especially having a short length, may be stabilized in a reliable manner.

According to the embodiment of the present disclosure discussed above, as shown in FIGS. 1 and 5, the driving tool 1 may include the guide member 40 that is movable between the closing portion and the opening position. In the closing position, the guide member 40 may close the relief passage 20*c*. In the opening position, the guide member 40 may open the relief passage 20*c*. Accordingly, when the guide member 40 is disposed in the closing position to cause the relief passage 20*c* to be blocked by the guide member 40, a driving posture of the driving member n in the driving passage 20*a* can be stabilized. The downward movement of the driver 15 which causes the plurality of engagement portions 15*a* of the driver 15 to push the guide member 40 to the opening position may allow the plurality of engagement portions 15*a* of the driver 15 to move in the relief passage 20*c*.

According to the embodiment discussed above, as shown in FIGS. 6-7, the guide member 40 may be configured to move from the closing position to the opening position by being pulled by the engagement portions 15*a* of the driver 15 when the driver 15 moves downward. Because of this configuration, the guide member 40 may move from the closing position to the opening position by a movement of the driver 15. Accordingly, a specific means for moving the guide member 40 may not be needed.

Still in FIGS. 6-7, the guide member 40 may move between the closing position and the opening position by a combined movement of a slide movement of the guide member 40 in the front-rear direction and the rotation movement of the guide member 40 around the upper portion thereof. Accordingly, the guide member 40 may move between the closing position and the opening position by a simple supporting configuration.

According to the embodiment discussed above, as shown in FIG. 5, the guide member 40 may be supported so as to be turnable in the front-rear direction around an upstream side of the guide member 40 (which serves as a rotation support portion) in the driving direction. Also, a downstream side of the guide member 40 in the driving direction may be guided by the movement guide 40*b* so as be slidable in the front-rear direction. Accordingly, a rotation movement of the guide member 40 may be stabilized.

According to the embodiment discussed above, as shown in FIGS. 6-7, the guide member 40 may be biased to the closing position by the biasing member 25. A state in which the relief passage 20*c* is closed by the guide member 40 may be retained by the biasing member 25. A movement of the guide member 40 to the opening position may be made against the biasing member 25.

According to the embodiment discussed above, as shown in FIGS. 4, 6-7, the driving tool 1 may include the damper 26 that contacts the guide member 40 when the guide member 40 moves from the closing position to the opening position. Because of this configuration, the damper 26 may absorb an impact of the guide member 40 when the guide member 40 moves to the opening position.

According to the embodiment discussed above, as shown in FIG. 4, the guide member 40 may extend on a downstream side in the driving direction beyond a lower end of a moving area of the plurality of engagement portions 15*a* of the driver 15 (a lower end portion of the relief passage 20*c*). Accordingly, the guide member 40 may extend long in the driving direction. Therefore, a driving posture of the driving member n may be stabilized in a more reliable manner.

According to the embodiment discussed above, as shown in FIGS. 6-7, the guide member 40 may be positioned along the driving member n that is supplied to the driving passage 20*a*. In a case where a short-sized driving member n having a length of, for example, about 20 mm is supplied to the driving passage 20*a*, the guide member 40 may extend below the driving member n on a downstream side in the driving direction. Accordingly, a supply position of the driving member n when the driving member n is supplied as well as a position of the driving member n when the driving member n is driven may be stabilized.

Still in FIGS. 6-7, the guide member 40 may be configured to move in the front-rear direction perpendicular to a protruding direction of the engagement portion 15*a* of the driver 15 (in a rightward direction). When the driver 15 moves downward in the up-down direction, the engagement portion 15*a* of the driver 15 may push the engaging surface 40*a* of the guide member 40, thereby moving the guide member 40 in the opening position. Accordingly, the guide member 40 may be arranged in a compact manner with respect to the driver 15. Eventually, the driving nose 20 may be arranged in a compact manner in the left-right direction.

According to the embodiment discussed above, as shown in FIG. 7, a direction in which the guide member 40 moves from the closing position to the opening position may be aligned with a direction in which the driving member n is supplied to the driving passage 20*a*. Accordingly, the driving nose 20 may be made compact in a direction (in the left-right direction) perpendicular to a moving direction of the guide member 40.

The embodiment of the present disclosure may be modified in various ways. In the above-exemplified embodiment, a combined movement of a rotation movement and a slide movement (parallel movement) of the guide member 40 in the front-rear direction may be exemplified. However, it may be configured such that the guide member 40 moves between the closing position and the opening position by either one of the rotation movement or the slide movement of the guide member 40. Furthermore, a rotation movement of the guide member 40 may be performed around a downstream side in the driving direction.

In the above-exemplified embodiment, the guide member 40 may move in the front-rear direction perpendicular to the protruding direction of the engagement positions 15*a* of the driver 15. However, a movement direction of the guide member 40 may be in a direction parallel to the protruding direction of the engagement portions 15*a* of the driver 15.

In the above-exemplified embodiment, the guide member 40 may extend from approximately a center portion of the relief portion 20*c* to a lower portion of the relief passage 20*c*. However, the guide member 40 may extend from an upstream side of the relief passage 20*c*.

The driving tool 1 in the above embodiment may be one example of a driving tool according to one aspect of the present disclosure. The piston 13 in the above embodiment may be one example of a piston according to one aspect of the present disclosure. The driving member n in the above embodiment may be one example of a driving member according to one aspect of the present disclosure. The driver 15 in the above embodiment may be one example of a driver according to one aspect of the present disclosure. The engagement portion 15*a* in the above embodiment may be one example of an engagement portion according to one aspect of the present disclosure. The lift wheel 33 in the above embodiment may be one example of a lift wheel according to one aspect of the present disclosure.

The driving passage 20*a* in the above embodiment may be one example of a driving passage according to one aspect of the present disclosure. The relief passage 20*c* in the above embodiment may be one example of a relief passage according to one aspect of the present disclosure. The guide member 40 in the above embodiment may be one example of a guide member according to one aspect of the present disclosure.

What is claimed is:

1. A driving tool, comprising:

a piston configured to move in a driving direction owing to a pressure of a gas;

a driver configured to drive a driving member by moving integrally with the piston in the driving direction;

a plurality of engagement portions arranged in a longitudinal direction of the driver;

a lifter successively engaged one of the plurality of engagement portions for returning the driver to an initial position of the driver;

a driving passage which the driving member is supplied into, and the driver passes through;

a relief passage which is open to the driving passage and through which the plurality of engagement portions of the driver passes when the driver passes therethrough; and a guide member configured to be movable between a closing position in which the relief passage is closed and an opening position in which the relief passage is open, wherein the guide member is configured such that the engagement portions of the driver engage the guide member for the guide member to move from the closing position to the opening position when the driver moves in the driving direction.

2. The driving tool according to claim 1, wherein the guide member is configured to move between the closing position and the opening position by rotation of the guide member.

3. The driving tool according to claim 1, wherein the guide member comprises:

a rotation support portion on an upstream side of the guide member in the driving direction; and a movement guide on a downstream side of the guide member in the driving direction, the movement guide configured to guide the guide member.

4. The driving tool according to claim 1, further comprising a biasing member configured to bias the guide member to the closing position.

5. The driving tool according to claim 1, further comprising a damper configured to contact the guide member when the guide member moves in a direction from the closing position to the opening position.

6. The driving tool according to claim 1, wherein the guide member is configured to extend on a downstream side in the driving direction beyond a lower end of an area in which the plurality of engagement portions of the driver move in the driving direction.

7. The driving tool according to claim 1, wherein the guide member is configured to be arranged along a longitudinal direction of the driving member and to extend below the driving member on a downstream side in the driving direction.

8. The driving tool according to claim 1, wherein the guide member is configured to be movable in a direction perpendicular to a protruding direction of the plurality of engagement portions of the driver.

9. The driving tool according to claim 1, wherein a direction in which the guide member moves from the closing position to the opening position is aligned with a direction in which the driving member is supplied to the driving passage.

10. The driving tool according to claim 4, wherein the biasing member is arranged on an upstream side of the guide member in the driving direction.

11. The driving tool according to claim 1, wherein the guide member comprises an engaging surface on a side of the guide member in a moving direction in which the guide member moves from the opening position to the closing position, the engaging surface being tilted in the moving direction as it extends in the driving direction.

12. The driving tool according to claim 2, wherein the guide member comprises a hook portion and a movement guide, the hook portion arranged on an upstream side of the guide member in the driving direction such that the guide member is turnable around the hook portion.

13. The driving tool according to claim 12, wherein the movement guide further comprises a support hole formed in a groove hole shape, the support hole extending in a direction in which the guide member moves between the opening position and the closing position.

14. The driving tool according to claim 13, wherein the movement guide further comprises a support shaft configured to insert the support hole.

15. A driving tool comprising:

a tool main body having a cylinder, the cylinder arranged in a tubular main body housing;

a piston arranged in the cylinder and configured to move in a driving direction owing to a pressure of a gas;

a driver configured to drive a driving member by moving integrally with the piston in the driving direction, the driver including a plurality of engagement portions arranged in a longitudinal direction of the driver;

a lift mechanism configured to return the driver to an initial position of the driver; and a driving nose arranged at a lower portion of the tool main body for stabilizing a driving posture of the driving member, the driving nose comprising:

a driving passage configured for supplying the driving member and for passing through the driver;

a relief passage configured for passing through the plurality of the engagement portions of the driver;

a driver guide configured for guiding the driver such that the driver drives the driving member in the driving direction; and a guide member configured to be movable between a closing position in which the relief passage is closed and an opening position in which the relief passage is open, the guide member serving as the driving passage when the guide member is in the opening position, wherein the guide member is configured such that the engagement portions of the driver engage the guide member for the guide member to move from the closing position to the opening position when the driver moves in the driving direction.

16. The driving tool according to claim 15, the driving nose further comprising a biasing member configured to bias the guide member to the closing position.

17. The driving tool according to claim 15, the driving nose further comprising a damper configured to contact the guide member when the guide member moves in a direction from the closing position to the opening position.

18. The driving tool according to claim 15, wherein the lift mechanism comprises a lift wheel having a plurality of engaging portions, each of the plurality of the engaging portions successively engaging each corresponding of the plurality of engagement portions of the driver.

19. The driving tool according to claim 15, wherein the driver guide has a wall portion configured to cover the driving passage circumferentially.

* * * * *